United States Patent
Hammerschmidt et al.

(10) Patent No.: US 11,184,153 B2
(45) Date of Patent: Nov. 23, 2021

(54) ULTRA WIDEBAND SECURE RANGING

(71) Applicant: Apple Inc., Cupertino, CA (US)

(72) Inventors: Joachim S. Hammerschmidt, Mountain View, CA (US); Eren Sasoglu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 16/459,733

(22) Filed: Jul. 2, 2019

(65) Prior Publication Data

US 2020/0014526 A1 Jan. 9, 2020

Related U.S. Application Data

(60) Provisional application No. 62/694,329, filed on Jul. 5, 2018.

(51) Int. Cl.
*H04L 29/06* (2006.01)
*H04L 9/06* (2006.01)
*H04W 12/106* (2021.01)

(52) U.S. Cl.
CPC ........... *H04L 9/065* (2013.01); *H04W 12/106* (2021.01)

(58) Field of Classification Search
CPC .. H04L 9/065; H04L 63/1416; H04W 12/106; H04W 12/03; H04W 12/033; H04W 12/108
See application file for complete search history.

(56) References Cited

U.S. PATENT DOCUMENTS

| | | | | |
|---|---|---|---|---|
| 7,970,350 | B2 * | 6/2011 | Sheynman | H04W 4/80 455/41.1 |
| 10,291,436 | B2 * | 5/2019 | Dutz | G01S 13/765 |
| 10,298,337 | B2 * | 5/2019 | Kuchler | G01S 13/765 |
| 10,404,490 | B2 * | 9/2019 | Dutz | G07C 9/00658 |
| 10,805,092 | B2 | 10/2020 | Dutz et al. | |

(Continued)

FOREIGN PATENT DOCUMENTS

| JP | 2006517373 | 7/2006 |
|---|---|---|
| WO | 2019110833 A1 | 6/2019 |

OTHER PUBLICATIONS

Office Action, Japan Patent Application No. 2019-125839, dated Aug. 11, 2020, 3 pages.

*Primary Examiner* — Hosuk Song
(74) *Attorney, Agent, or Firm* — Kowert, Hood, Munyon, Rankin & Goetzel, P.C.

(57) ABSTRACT

Methods and apparatuses are presented to generate, and verify reception of, ultra wideband (UWB) communications, e.g., to perform secure UWB ranging. Verifier and prover messages may be encoded on top of random cryptographically secure training sequence (STS) of pulses, organized in blocks such that a given block corresponds to a given message bit. In some scenarios, a first STS may be encoded using a verifier message not known to a recipient device. A second STS may be received from the recipient device, encoded with an unknown prover message. A third STS may also be received, encoded with an authentication message generated using the verifier message and the authentication message. Verification of the authentication message can therefore confirm that the recipient device received the first STS, and that the recipient device is the authentic source of the second STS. Thus, the second STS may be relied upon, e.g., for ranging calculations.

20 Claims, 5 Drawing Sheets

(56) References Cited

U.S. PATENT DOCUMENTS

| | | |
|---|---|---|
| 10,944,552 B2 * | 3/2021 | Leong ................ H04L 63/04 |
| 2018/0138993 A1 | 5/2018 | Kucheler et al. |
| 2019/0273636 A1 | 9/2019 | Batra et al. |

* cited by examiner

ULTRA WIDEBAND SECURE RANGING

PRIORITY CLAIM

This application claims benefit of priority of U.S. provisional application Ser. No. 62/694,329, titled "Ultra Wideband Secure Ranging", filed Jul. 5, 2018, whose inventors are Joachim S. Hammerschmidt and Eren Sasoglu, which is hereby incorporated by reference in its entirety as though fully and completely set forth herein.

TECHNICAL FIELD

The present application relates to wireless communication, including to techniques for performing secure ranging for wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication. In particular, ultra wideband (UWB) devices may be used to perform accurate ranging. Ranging may be performed through time-of-arrival measurements, in combination with message exchanges to extract time-of-flight.

Ranging can provide a wireless key type functionality, among various possible functions. Accordingly, security can be an important consideration, e.g., in order to protect ranging communications from adversarial attack and eavesdropping.

For example, security is often a requirement in message-exchange based ranging, e.g., to make sure signals (malicious or benign) from non-participating devices do not alter the time-of-arrival calculations at the corresponding receivers of the participating devices. One way to achieve this type of security is to make the UWB ranging packet difficult to fake (or "spoof") by an attacker. Protecting a ranging packet against spoofing can be done by including a cryptographically secure random sequence in the UWB ranging packet, which is known only to the ranging parties. In conventional implementations, the very low UWB transmit and receive signal powers require long correlators in order to accurately extract (or determine) time-of-arrival from a secure training sequence (STS). Long time correlation at the receiver can make an STS vulnerable to attack, even when the underlying bit sequence is cryptographically secure.

Accordingly, improvements in the field are desired.

SUMMARY

Embodiments are presented herein of, inter alia, systems, apparatuses, and methods for performing secure ranging wireless communication.

According to the techniques described herein, secure ranging wireless communication can be performed using ultra wideband (UWB) communications in a manner that can help protect against various types of attacks.

Methods and apparatuses are presented to generate, and verify reception of, UWB communications, e.g., for use in secure UWB ranging. Verifier and prover messages may be encoded on top of random cryptographically secure training sequence (STS) of pulses, organized in blocks such that a given block corresponds to a given message bit.

A method is presented for generating a first UWB packet. The method may include a wireless communication device generating a first secure training sequence (STS) that comprises a cryptographically encoded random STS pulse sequence; and dividing the STS pulse sequence between two or more subblocks, wherein a subblock of the two or more subblocks is associated with a bit corresponding to a separate verifier message, wherein a polarity of a plurality of pulses in the subblock is set based on the bit.

In some scenarios, the method may further include the wireless communication device inserting a gap between two subblocks of the two or more subblocks.

In some scenarios, the method may further include the wireless communication device transmitting the first UWB packet to a remote communication device, wherein the first STS is known to the remote communication device, and wherein the verifier message is not known to the remote communication device.

In some scenarios, the method may further include the wireless communication device receiving from the remote communication device a second UWB packet comprising a second STS that is divided between two or more subblocks, wherein a subblock of the two or more subblocks of the second STS is associated with a bit corresponding to a separate prover message, wherein a polarity of a plurality of pulses in the subblock of the second STS is based on the bit. The second STS may be known to the wireless communication device, and the prover message may not be known to the wireless communication device.

In some scenarios, the method may further include the wireless communication device receiving from the remote communication device a third UWB packet comprising a third STS that is divided between two or more subblocks, wherein a subblock of the two or more subblocks of the third STS is associated with a bit corresponding to a separate authentication message, wherein a polarity of a plurality of pulses in the subblock of the third STS is based on the bit, wherein the third STS is known to the wireless communication device, and wherein the authentication message is the result of applying an algorithm to the verifier message and the prover message. The wireless communication device may determine a first estimate of the authentication message by comparing the known values of the pulses of the third STS with the received values of the pulses of the third UWB packet. The wireless communication device may determine that the remote wireless device received the first UWB packet based on the first estimate of the authentication message.

In some scenarios, determining that the remote wireless device received the first UWB packet based on the first estimate of the authentication message may include determining an estimate of the prover message by comparing the known values of the pulses of the second STS with the received values of the pulses of the second UWB packet; determining a second estimate of the authentication message by applying the algorithm to the verifier message and the estimate of the prover message; and determining that the first estimate of the authentication message and the second estimate of the authentication message are sufficiently similar.

In other scenarios, determining that the remote wireless device received the first UWB packet based on the first estimate of the authentication message may include determining a first estimate of the prover message by comparing the known values of the pulses of the second STS with the received values of the pulses of the second UWB packet; determining a second estimate of the prover message by applying a reverse of the algorithm to the first estimate of the authentication message, using the verifier message; and determining that the first estimate of the prover message and the second estimate of the prover message are sufficiently similar.

A method is presented for securely exchanging wireless communication messages, such as UWB communications. The method may include a verifier device encoding a first secure training sequence (STS) that is known to a prover device, using a verifier message that is not known to the prover device and transmitting to the prover device a first message comprising the first STS. The method may further include the verifier device receiving from the prover device a second message including a second STS that is known to the verifier device and that is encoded using a prover message that is not known to the verifier device and determining an estimate of the prover message by decoding the second STS. The method may further include the verifier device receiving from the prover device a third message including a third STS that is known to the verifier device and that is encoded using a message authentication code, wherein the message authentication code is the result of applying an algorithm to the verifier message and the prover message. The method may further include the verifier device determining a first estimate of the message authentication code by decoding the third STS, and determining a second estimate of the message authentication code by applying the algorithm to the verifier message and the estimate of the prover message. The method may further include the verifier device determining that the second message is authentic based on a determination that the first estimate of the message authentication code and the second estimate of the message authentication code are sufficiently similar.

In some scenarios, the method may further include the verifier device determining a range between the verifier device and the prover device based on a reception time of the message comprising the second STS, in response to determining that the second message is authentic.

In some scenarios, encoding the first STS may include encoding a plurality of subblocks of the first STS with respective bits of the verifier message. For example, encoding a subblock of the first STS may include reversing the polarity of at least one pulse of the subblock in response to the respective bit of the verifier message having a first value, and maintaining the original polarity of the at least one pulse of the subblock in response to the respective bit of the verifier message having a second value. In some scenarios, encoding the first STS further comprises separating the subblocks with guard intervals.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
FIG. 1 illustrates an example wireless communication system, according to various exemplary embodiments described herein.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

Various details of example UWB communication protocols are disclosed in IEEE 802.15.4-2015, which is hereby incorporated by reference as though disclosed herein in its entirety.

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques, potentially including secure ranging wireless communication techniques.

As one possibility, the first wireless device 102 and the second wireless device 104 may perform secure ranging using ultra wideband (UWB) communication technology (e.g., IEEE 802.15.4 WPAN communication) and/or other techniques based on WPAN or WLAN wireless communication. One or both of the wireless device 102 and the wireless device 104 may also be capable of communicating via one or more additional wireless communication protocols, such as any of Bluetooth (BT), Bluetooth Low Energy (BLE), WLAN (e.g., IEEE 802.11/Wi-Fi), near field communication (NFC), GSM, UMTS (WCDMA, TDSCDMA), LTE, LTE-Advanced (LTE-A), NR, 3GPP2 CDMA2000 (e.g., 1xRTT, 1xEV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, or virtually any type of mobile wireless device. As another possibility, one or more of the wireless devices 102, 104 may be a substantially stationary device, such as a set top box, media player (e.g., an audio or audiovisual device), gaming console, desktop computer, appliance, door, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards. For example, a device might be configured to communicate using either of Bluetooth or UWB using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1xRTT, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102, 104 may communicate using one or more secure ranging wireless communication techniques or features described subsequently herein with respect to FIGS. 4-9. By utilizing such techniques (and/or other techniques described herein), the wireless device(s) may (at least according to some embodiments) be able to achieve highly secure ranging communication.

Figure 2:
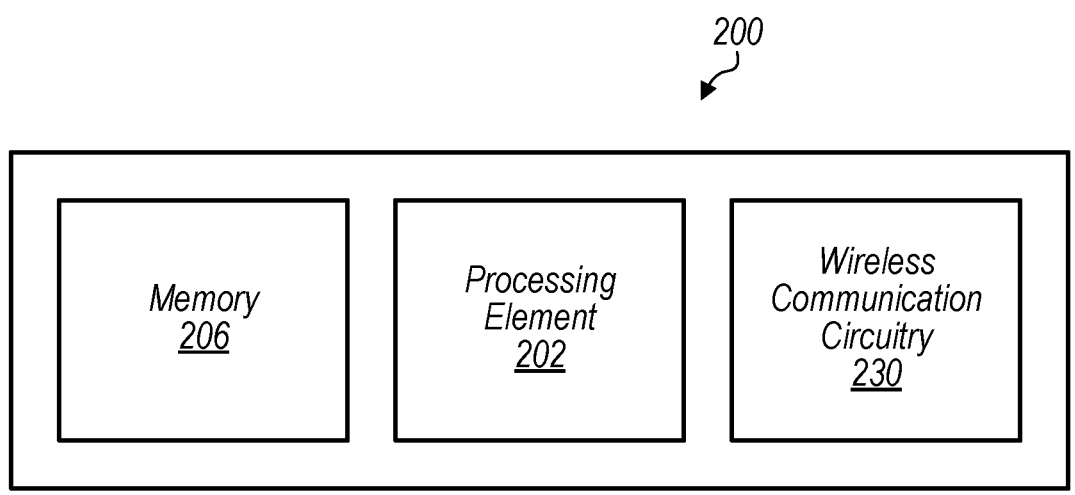
FIGS. 2-3 are block diagrams illustrating example wireless devices, according to various exemplary embodiments described herein.
Figure 3:
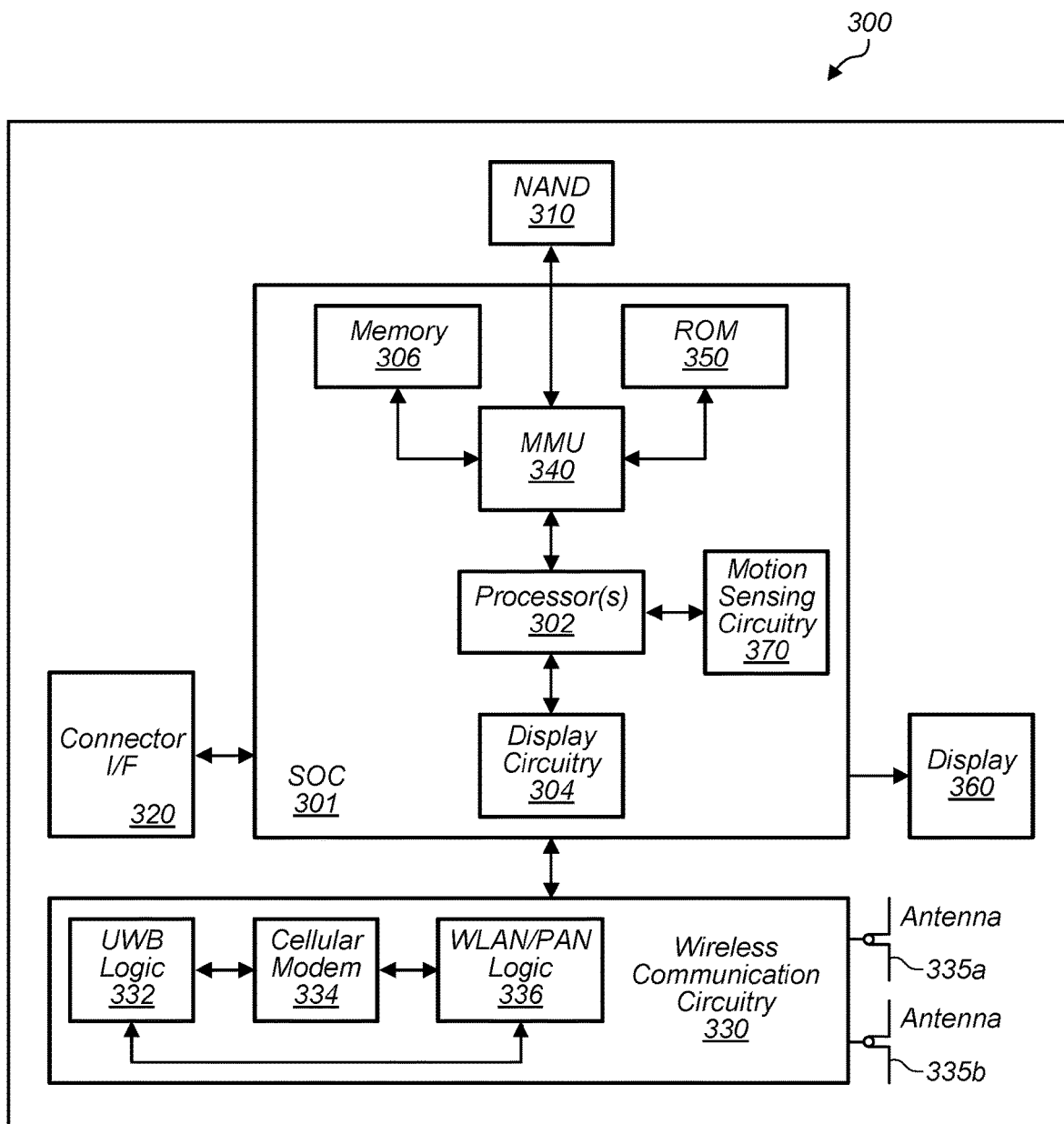

FIGS. 2-3—Exemplary Device Block Diagrams

FIG. 2 illustrates an exemplary wireless device 200 that may be configured for use in conjunction with various aspects of the present disclosure. For example, the device 200 may be an example of the wireless device 102 or the wireless device 104. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more secure ranging wireless communication techniques or features, such as any of the techniques or features illustrated and/or described subsequently herein with respect to any or all of FIGS. 4-9.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be (or include) an 'application processor' whose primary function may be to support application layer operations in the device 200, while the wireless communication circuitry 230 might include a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include UWB Logic 332, a Cellular Modem 334, and additional WLAN/PAN Logic 336. The UWB Logic 332 is for enabling the wireless device 300 to perform UWB communications, e.g., according to 802.15 protocols or for secure ranging communications. The WLAN/PAN Logic 336 is for enabling the wireless device 300 to perform other WLAN and/or PAN communications, such as Wi-Fi and/or Bluetooth communications. The cellular modem 334 may be capable of performing cellular communication according to one or more cellular communication technologies.

As described herein, wireless device 300 may include hardware and software components for implementing embodiments of this disclosure. For example, one or more components of the wireless communication circuitry 330 (e.g., UWB Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Secure Ranging

Figure 4:
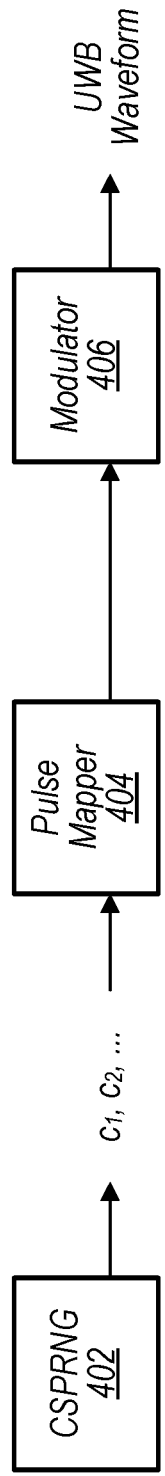
FIG. 4 shows an example flow diagram for generating a UWB waveform that can be used to perform secure ranging according to various exemplary embodiments described herein.
Figure 5:
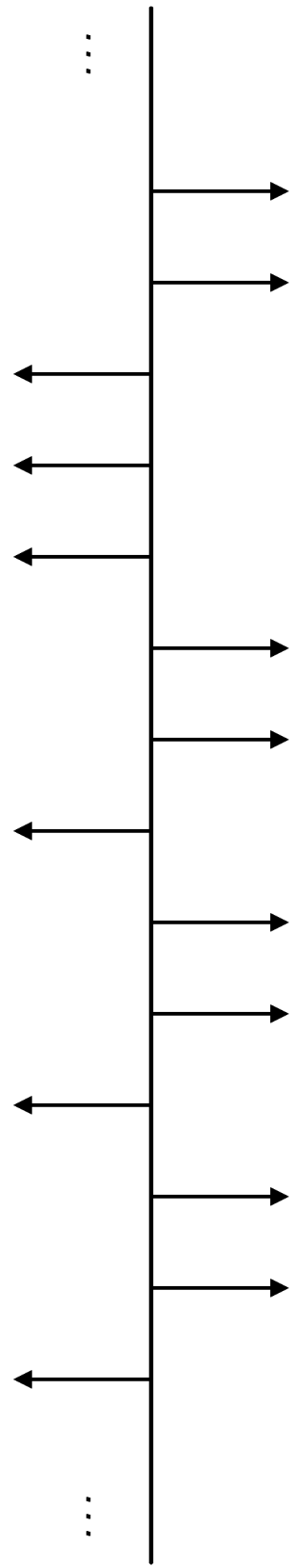
FIG. 5 shows an example pulse sequence corresponding to a UWB waveform, such as the UWB waveform of FIG. 1, according to various exemplary embodiments described herein.

An example portion of a block diagram of a system or apparatus for generating a secure ranging sequence (e.g., a secure training sequence (STS)) of an UWB packet is shown in FIG. 4. In the example portion, a number of random bits $c_i$ are generated using a cryptographically secure random (or pseudorandom) number generator (CSPRNG) 402. The bits generated using the CSPRNG 402 are mapped to pulse polarities and positions through the use of a pulse mapper 404. In some implementations, the mapping may be arbitrary. In other implementations, the mapping may be performed in accordance with a predetermined algorithm. In an illustrative example, the CSPRNG 402 may generate $2^{16}$ bits (or other number of bits) $c_i$ and each bit may determine, or otherwise represent, the polarity +/−1 of a single pulse. The pulses may be spread by 8 pulse positions (or other number of pulse positions), e.g., resulting in the example pulse sequence shown in FIG. 5. The pulses can then be modulated by a UWB modulator 406.

In other exemplary implementations, e.g., a further discussed below, one or more of the bits determining pulse positions, or the entire pulse sequence, may be segmented into two or more smaller sections with guard intervals between them.

According to some implementations, the CSPRNG 402, the pulse mapper 404, and/or the modulator 406 may be included in wireless communication circuitry (e.g., 230 and/or 330) or some portion thereof, such as the UWB logic 332.

Ranging security can be enhanced by modifying STS frames to enable their use in conjunction with cryptographic challenge-response protocols. A challenge-response protocol involving devices A and B allows Device A to validate the first path extracted by device B. In one example, described in more detail below, Device B may attempt to decode, based on its received first path, a number of "challenge" bits sent by Device A. Device B may then send a secure response back to Device A, e.g., using a public key scheme. Device A may validate the response from Device B, thereby validating device B's determination of the time-of-arrival. In other implementations, the modified STS structure can be implemented without utilizing a challenge-response protocol.

Figure 6:
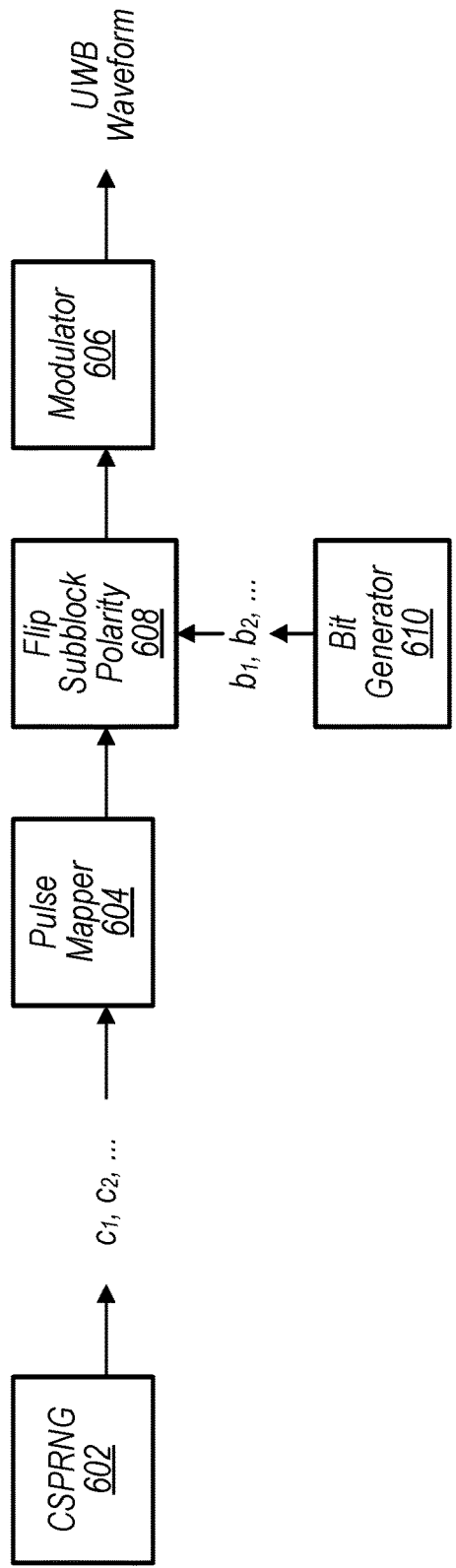
FIG. 6 shows an example flow diagram for dividing an STS pulse sequence into subblocks and processing one or more of the pulses, according to various exemplary embodiments described herein.

FIG. 6 a modified portion of a block diagram of a system or apparatus for generating a secure ranging sequence of an UWB packet. According to some implementations, the system shown in FIG. 6 may be included in wireless communication circuitry (e.g., 230 and/or 330) or some portion thereof, such as the UWB logic 332. As illustrated, CSPRNG 602 may generate a number of random bits $c_i$, which may be mapped to pulse polarities and positions through the use of a pulse mapper 604, as in FIG. 4. The secure ranging techniques may further include logically dividing the STS pulse sequence into two or more subblocks. A guard interval may be inserted between subblocks. Further, in the example of FIG. 6, the polarity of any/all pulses in the $i^{th}$ subblock may be multiplied by a bit e.g., by an encoder, such as flip-subblock-polarity module 608. Accordingly, a subblock can "encode" (or be encoded to represent) the value $b_i$. The bits $b_i$ can be generated in any manner, e.g., by a bit generator 610, but in some implementations, they may for example correspond to challenge bits in a challenge-response protocol, and may be provided by one or more upper layers. Any number of bits and therefore any number of subblocks, may be chosen, as long as the number is consistent with the underlying STS generation mechanism. Further, the number chosen may be based on one or more factors, such as, but not limited to, one or more requirements including sensitivity, security, etc. For example, a larger number of bits $b_i$ may be used, representing a greater number of challenge bits, where a greater level of security is desired. The encoded pulses can be modulated by a UWB modulator 606 and transmitted to device B as a UWB waveform, e.g., by transmit circuitry (not shown).

Figure 7:
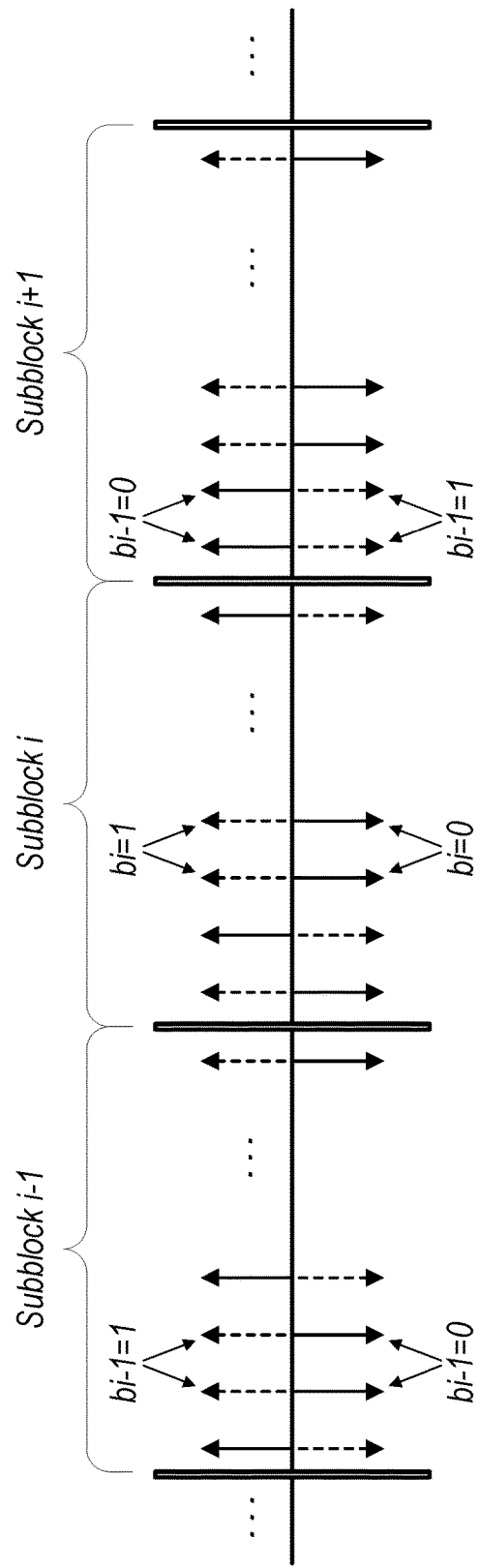
FIG. 7 shows an example of three consecutive subblocks generated according to various exemplary embodiments described herein.

FIG. 7 shows an example of three consecutive subblocks generated using the disclosed techniques. In the example of FIG. 7, solid pulse polarities in the $i^{th}$ subblock correspond to $b_i=0$, and dashed pulse polarities correspond to $b_i=1$.

Note that no changes to the STS frame length, or the number and/or position of pulses are necessary. In addition, the cryptographic security properties of the modified STS sequence will be similar to the original sequence $c_i$ as long as the bits $b_i$ that modify the subblocks are independent of $c_i$. Therefore, receivers and security protocols that were designed for the original sequence can still be used with the modified sequence, requiring only minor adjustments.

In an example using these techniques, an example packet format (or frame format) may include any or all of the following frame elements (or frame segments):

- a publicly known Preamble Sequence, e.g., a periodic sequence of pulses;
- a Start-of-Frame Delimiter (SFD) that marks the end of the Preamble;
- the Secure Training Sequence (STS) according to the above random pulse sequence with message encoding (message-encoded STS, or "ME-STS"), e.g., as discussed further below; and
- optionally, a PHY Header (PHR) and Data payload.

The UWB HRP chapter per IEEE 802.15.4-2015 presents examples of how to generate Preambles, SFD, and PHR and Data Payload segments.

Note that the STS may also be implemented after the Data payload, instead of between the SFD and the PHR. Furthermore, in some implementations, the PHR and Data payload may be omitted altogether.

Figure 8:
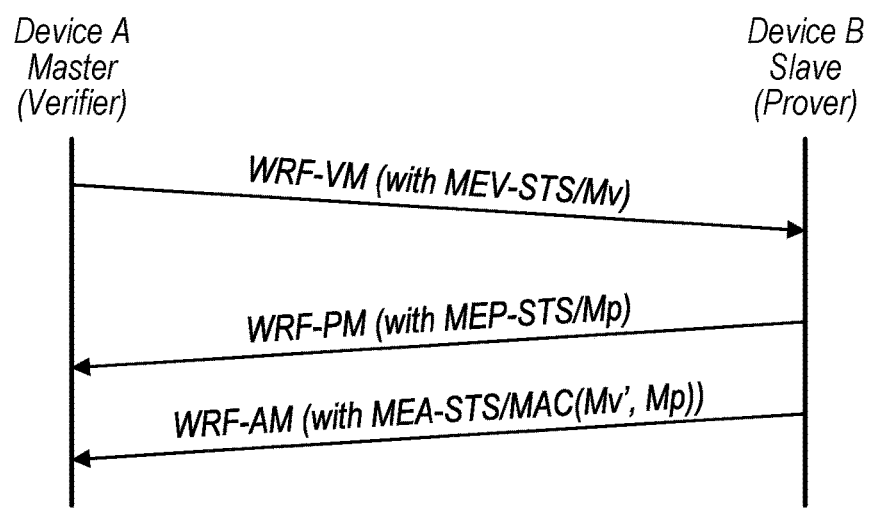
FIG. 8 shows a signal diagram of an example implementation according to various exemplary embodiments described herein.

FIG. 8 presents a signal flow diagram of an example implementation as time passes from top to bottom, according to some embodiments. Specifically, FIG. 8 illustrates signals communicated between a Device A, which may be a master or verifier device, and a Device B, which may be a slave or prover device. Each of Device A and Device B may be a wireless device such as the wireless device 200 and/or the wireless device 300.

Device A may generate a random "challenge" (or verifier) sequence Mv[i], i=0 ... $L_{c-1}$, where i is the bit index in the sequence and $L_c$ is the length of the challenge sequence in number of bits. $L_c$ may be, e.g., 16, 32, 64, or any other number of bits. The challenge sequence may preferably be unknown to all other devices, including the connected Device B. Note that the sequence Mv represents what was referred to as bits $b_i$ above.

Device A may also prepare an initial STS sequence by generating a cryptographically secure random sequence. This random STS sequence is known to both devices A and B. In some implementations, the random STS sequence may change from packet to packet, e.g., based on a cryptographic generation process. The initial STS sequence can represent a large number of random pulses $L_p$, such as 100 to 1,000 pulses, 1,000 to 10,000 pulses, tens of thousands of pulses, hundreds of thousands of pulses, millions of pulses, etc. The random STS sequence may preferably be unknown to any devices other than Device A and B.

Device A may subdivide the total number of pulses $L_p$ into segments (or subblocks) of $L_s$ pulses. The polarity of the first $L_s$ pulses may remain unchanged if Mv[0] has bit value 0, or be flipped if it has a bit value of 1. In other implementations, a bit value of 0 causes the polarity to be flipped, while a bit value of 1 causes the bit value to remain unchanged. The second verifier message bit, Mv[1], may be used to determine whether to flip (or not to flip) the second subblock of $L_s$ pulses, and so on. In some embodiments, Lp may be an integer multiple of $L_s$ with the multiple corresponding to $L_c$ (e.g., $L_s * L_c = L_p$). This process creates the message-encoded STS (ME-STS). In the present example, the message represents the verifier message Mv. The resulting pulse sequence is referred to as the message-encoded verifier STS (MEV-STS).

Device A may generate a wireless ranging frame including a verifier message (WRF-VM). The WRF-VM may, in some scenarios, include a Periodic Preamble, SFD, MEV-STS, and/or other PHR and payload data as desired.

Device A may transmit the WRF-VM to Device B.

Device B may receive the Periodic Preamble and extract a Channel Estimate (or Channel Impulse Response, CIR) from the known periodic preamble. Device B may also extract from the CIR the position of the first propagation path in what may be a multitude of propagation paths, such as reflections. The first path corresponds to the shortest measured distance, or line-of-sight (LOS) path.

Device B may determine the start of the MEV-STS, e.g., based on the SFD (which also is publicly known), and may then correlate each subblock of $L_s$ received pulses ("smeared" by the propagation channel) to a corresponding segment of $L_s$ expected pulses from the STS sequence, as the STS sequence is known to both Device A and Device B. The outcome of the correlation of each subblock can then be used to detect (e.g., estimate through conventional slicing) the polarity of the verifier message bit Mv[i] for the $i^{th}$ subblock. In some implementations, the detection/slicing operation will only use the position of the first path derived in the Preamble CIR. This way Device B recreates an estimate of the original verifier message Mv that was transmitted by Device A, under the assumption that this message is indeed carried (transmitted) by the first (most direct or shortest) propagation path. Since the received message will not necessarily always coincide with the truly transmitted message, it will be referred to as Mv'. If no losses occurred (e.g., due to noise, attacks, etc.), Mv' will be identical to Mv.

Device B may transmit to Device A a similarly constructed frame: e.g., a wireless ranging frame prover message (WRF-PM). For example, the WRF-PM may include a second ME-STS message. Specifically, Device B may generate a second STS sequence, which is known to both Device B and Device A. Device B may message-encode the second STS sequence using a prover message Mp, e.g., in the same or similar manner in which the first STS sequence was encoded using the verifier message Mv. For example, Device B may subdivide the total number of pulses of the second STS into subblocks of $L_s$ pulses, and may modify the polarity of the pulses of the $i^{th}$ subblock based on the value of a corresponding bit Mp[i]. Thus, the message of the second ME-STS represents the prover message Mp. The resulting pulse sequence is referred to as the message-encoded prover STS (MEP-STS).

Device B may randomly generate the prover message Mp, which may not be known to any other device (including Device A). The prover message Mp may have the same length as the verifier message Mv or may have a different length.

The MEP-STS may be included in the response packet WRF-PM that is sent back to Device A.

Device B may also send to Device A a third frame (the second transmitted from Device B to Device A): e.g., a wireless ranging frame authentication message (WRF-AM). The WRF-AM may include a third ME-STS message. For example, Device B may use a cryptographically secure Mapping Mechanism to map the received message Mv' and the prover message Mp to a Message Authentication Code (MAC) that depends on Mv' and Mp: MAC(Mv', Mp). This mapping mechanism, which produces a new message Ma, may in some implementations be a well-known hashing mechanism, such as HMAC. Note that the Mapping Mechanism between the challenge message and the response message is known to both devices A and B, but is unknown to other devices. The resulting authentication message Ma=MAC(Mv', Mp) may be used to encode a new (third) STS sequence known to both Devices A and B, e.g., in the same or similar manner in which the first STS sequence was encoded using the verifier message Mv. The resulting pulse sequence is referred to as the message-encoded authentication STS (MEA-STS). The MEA-STS may be included in the packet WRF-AM that is sent to Device A.

Device A may receive the two frames (WRF-PM and WRF-AM) from Device B, and perform functions similar to those Device B performed upon receiving the WRF-VM. For example, Device A may extract the prover message Mp, using its locally estimated CIR (based on the preamble of WRF-PM), by committing to the first path and performing extraction bit by bit to generate a reconstructed Mp'. Device A may similarly extract the authentication message Ma, using its locally estimated CIR (based on the preamble of WRF-AM), by committing to the first path and performing extraction bit by bit to generate a reconstructed Ma'.

Device A may then use message Mv (which it generated) and message Mp' to produce (reconstruct) a local version of the expected authentication code Ma, namely Ma_rec=MAC(Mv, Mp').

Device A may then compare the reconstructed Ma_rec and Ma', e.g., using comparator logic (including software and/or hardware), which may, for example, be included in the UWB logic 332 or the processor(s) 302. In response to determining that there is a sufficiently close match (e.g., if the percentage of matching bits meets a predetermined threshold), Device A may mark the exchange as a success. The Time of Flight (ToF) (e.g., one-way and/or round-trip) can then be computed based on the first path extracted from the two local CIR's, as measured by the two devices A and B (the CIRs of WRF-VM and WRF-PM). Device A may compute the range (e.g., physical distance or propagation distance) between Device A and Device B, based on the ToF.

Alternatively, Device A may apply to Ma' a reverse of the Mapping Mechanism, to reconstruct a local version of the verifier message Mv' and/or the prover message Mp used to generate Ma. The local version of the verifier message may be referred to as Mv" and the local version of the prover message may be referred to as Mp". For example, Device A may use the prover message Mp with the reverse of the Mapping Mechanism to reconstruct a local version of the verifier message Mv". As another example, Device A may use the verifier message Mv' with the reverse of the Mapping Mechanism to reconstruct a local version of the prover message Mp". Device A may then compare the local version Mv" to Mv and/or compare the local version Mp" to Mp'. In response to determining that there is a sufficiently close match, Device A may mark the exchange as a success.

In some implementations, the turn-around time at Device B between the first path of the incoming WRF-VM frame and the departure time of the outgoing WRF-PM may be fixed and/or known a-priori to both devices A and B. This helps device A compute the overall time of flight, even without knowing explicit time-stamps (or a time-stamp delta) from Device B.

The preceding techniques provide a unique mechanism through which the verifier and prover messages, Mv and Mp, are encoded on top of random cryptographically secure STS sequences of pulses, organized in blocks, such that a given block corresponds to a given message bit.

Note that, as illustrated above, a message bit can be used to encode (flip or not-flip) the polarity of an entire subblock of Ls pulses. In some other implementations, a message bit can be used to modify another property of a subblock of Ls pulses, such as the position of the Lb pulses in a respective subblock.

Also note that the cryptographically secure STS generation process, e.g., which ensures both Devices A and B know how to generate an STS known to both devices but no other devices, and the cryptographically secure Challenge-to-Response mapping function from Mv to Mp, which is also known only to Devices A and B, may be handled at one or more upper processing layers through suitable encryption mechanisms, such as encryption keys.

Additionally, note that the "subblock polarity flipping" to encode the messages may take place in the binary domain (e.g., using xor functionality or the like) before the pulse mapper or by explicitly flipping the polarity after the pulse mapper. A person skilled in the art recognizes that various other implementations can be chosen to accomplish the same effect on the final ME-STS sequence of pulses.

Figure 9:
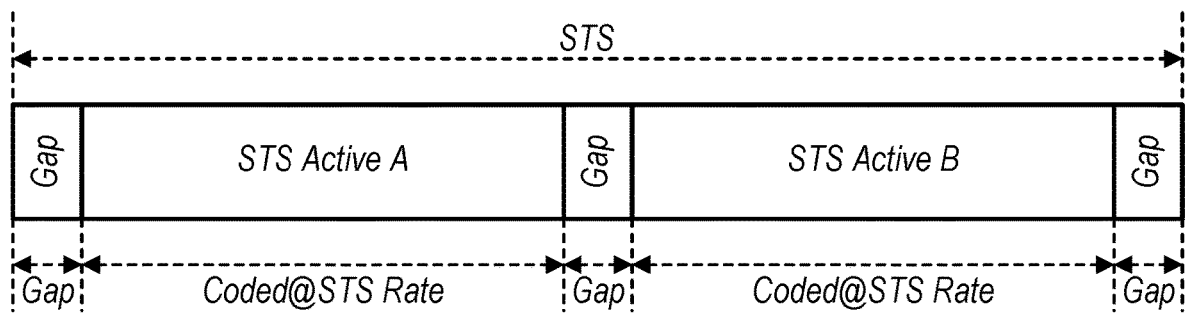
FIG. 9 shows an example STS that includes Active Segments and Gaps according to various exemplary embodiments described herein.

The ME-STS portion of the packet may include one or more active segments and one or more gaps (or guard intervals). In the present techniques, a gap is a period of silence between two time intervals during which pulses produced in the STS encoding are transmitted. FIG. 9 shows an example format having three gaps (beginning, middle, and end) and two active segments (A and B). A message-encoded STS may use such a structure (or any adaptation thereof), by mapping the generated message encoding STS pulses onto one or more active segments. Further, a gap can be included before and/or after an active segment, and/or between two active segments. The number of pulses in a message-encoding subblock may coincide with the number of pulses in an active segment, so that consecutive subblocks of the message-encoded STS map onto consecutive STS Active Segments. In some scenarios, the gaps may be sufficiently long to reduce or eliminate overlap of subblocks when received in a multipath environment.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of generating a first ultra wideband (UWB) packet, the method comprising:
by a wireless communication device:
generating a first secure training sequence (STS) that comprises a cryptographically encoded random STS pulse sequence; and
dividing the STS pulse sequence between two or more subblocks, wherein a subblock of the two or more subblocks is associated with a bit corresponding to a separate verifier message, wherein a polarity of a plurality of pulses in the subblock is set based on the bit.

2. The method of claim 1, further comprising:
by the wireless communication device:
inserting a gap between two subblocks of the two or more subblocks.

3. The method of claim 1, further comprising:
by the wireless communication device:
transmitting the first UWB packet to a remote communication device, wherein the first STS is known to the remote communication device, and wherein the verifier message is not known to the remote communication device.

4. The method of claim 3, further comprising:
by the wireless communication device:
receiving from the remote communication device a second UWB packet comprising a second STS that is divided between two or more subblocks, wherein a subblock of the two or more subblocks of the second STS is associated with a bit corresponding to a separate prover message, wherein a polarity of a plurality of pulses in the subblock of the second STS is based on the bit.

5. The method of claim 4, wherein the second STS is known to the wireless communication device, and wherein the prover message is not known to the wireless communication device.

6. The method of claim 5, further comprising:
by the wireless communication device:
receiving from the remote communication device a third UWB packet comprising a third STS that is divided between two or more subblocks, wherein a subblock of the two or more subblocks of the third STS is associated with a bit corresponding to a separate authentication message, wherein a polarity of a plurality of pulses in the subblock of the third STS is based on the bit, wherein the third STS is known to the wireless communication device, and wherein the authentication message is the result of applying an algorithm to the verifier message and the prover message;

determining a first estimate of the authentication message by comparing the known values of the pulses of the third STS with the received values of the pulses of the third UWB packet; and determining that the remote wireless device received the first UWB packet based on the first estimate of the authentication message.

7. The method of claim 6, wherein determining that the remote wireless device received the first UWB packet based on the first estimate of the authentication message comprises:

determining an estimate of the prover message by comparing the known values of the pulses of the second STS with the received values of the pulses of the second UWB packet;

determining a second estimate of the authentication message by applying the algorithm to the verifier message and the estimate of the prover message; and determining that the first estimate of the authentication message and the second estimate of the authentication message are sufficiently similar.

8. The method of claim 6, wherein determining that the remote wireless device received the first UWB packet based on the first estimate of the authentication message comprises:

determining a first estimate of the prover message by comparing the known values of the pulses of the second STS with the received values of the pulses of the second UWB packet;

determining a second estimate of the prover message by applying a reverse of the algorithm to the first estimate of the authentication message, using the verifier message; and determining that the first estimate of the prover message and the second estimate of the prover message are sufficiently similar.

9. A wireless communication device, comprising:

a pseudorandom number generator configured to generate a first secure training sequence (STS) that is known to a prover device;

an encoder configured to encode the first STS using a verifier message that is not known to the prover device;

transmit circuitry configured to transmit a message comprising the encoded first STS to the prover device;

receive circuitry configured to:
  receive from the prover device a second message comprising a second STS that is known to the wireless communication device and that is encoded using a prover message that is not known to the wireless communication device; and
  receive from the prover device a third message comprising a third STS that is known to the wireless communication device and that is encoded using a message authentication code, wherein the message authentication code is the result of applying an algorithm to the verifier message and the prover message;

a decoder configured to:
  determine an estimate of the prover message by decoding the second STS;
  determine a first estimate of the message authentication code by decoding the third STS; and
  determine a second estimate of the message authentication code by applying the algorithm to the verifier message and the estimate of the prover message; and a comparator configured to determine whether the first estimate of the authentication code and the second estimate of the message authentication code are similar to a specified degree.

10. The wireless communication device of claim 9, further comprising:

a ranging module configured to determine a range between the wireless communication device and the prover device based on a reception time of the message comprising the second STS, in response to determining that the first estimate of the message authentication code and the second estimate of the message authentication code are similar to the specified degree.

11. The wireless communication device of claim 9, further comprising:

a modulator configured to modulate the first message as an ultra wideband (UWB) communication.

12. The wireless communication device of claim 9, wherein encoding the first STS comprises encoding a plurality of subblocks of the first STS with respective bits of the verifier message, each subblock comprising a plurality of pulses.

13. The wireless communication device of claim 12, wherein encoding a subblock of the first STS comprises reversing the polarity of the plurality of pulses of the subblock in response to the respective bit of the verifier message having a first value, and maintaining the original polarity of the plurality of pulses of the subblock in response to the respective bit of the verifier message having a second value.

14. The wireless communication device of claim 12, wherein encoding the first STS further comprises separating the subblocks with guard intervals.

15. A method for securely exchanging wireless communication messages by a verifier device:
  encoding a first secure training sequence (STS) that is known to a prover device, using a verifier message that is not known to the prover device;
  transmitting to the prover device a first message comprising the first STS;
  receiving from the prover device a second message comprising a second STS that is known to the verifier device and that is encoded using a prover message that is not known to the verifier device;
  determining an estimate of the prover message by decoding the second STS;
  receiving from the prover device a third message comprising a third STS that is known to the verifier device and that is encoded using a message authentication code, wherein the message authentication code is the result of applying an algorithm to the verifier message and the prover message;
  determining a first estimate of the message authentication code by decoding the third STS;
  determining a second estimate of the message authentication code by applying the algorithm to the verifier message and the estimate of the prover message; and
  determining that the second message is authentic based on a determination that the first estimate of the message authentication code and the second estimate of the message authentication code are sufficiently similar.

16. The method of claim 15, further comprising:
by the verifier device:
   in response to determining that the second message is authentic, determining a range between the verifier device and the prover device based on a reception time of the message comprising the second STS.

17. The method of claim 15, wherein the first wireless communication message and the second wireless communication message are ultra wideband (UWB) communications.

18. The method of claim 15, wherein encoding the first STS comprises encoding a plurality of subblocks of the first STS with respective bits of the verifier message.

19. The method of claim 18, wherein encoding a subblock of the first STS comprises reversing the polarity of at least one pulse of the subblock in response to the respective bit of the verifier message having a first value, and maintaining the original polarity of the at least one pulse of the subblock in response to the respective bit of the verifier message having a second value.

20. The method of claim 18, wherein encoding the first STS further comprises separating the subblocks with guard intervals.

* * * * *